US006966998B1

(12) United States Patent
Spowart

(10) Patent No.: US 6,966,998 B1
(45) Date of Patent: Nov. 22, 2005

(54) SECURITY PRINTING

(76) Inventor: Alexander Rollo Spowart, The Larches, Sandbank, Argyll, PA23 8PW (GB)

(*) Notice: Subject to any disclaimer, the term of this patent is extended or adjusted under 35 U.S.C. 154(b) by 0 days.

(21) Appl. No.: 09/831,214

(22) PCT Filed: Nov. 8, 1999

(86) PCT No.: PCT/GB99/03692

§ 371 (c)(1),
(2), (4) Date: Aug. 8, 2001

(87) PCT Pub. No.: WO00/27645

PCT Pub. Date: May 18, 2000

(30) Foreign Application Priority Data

Nov. 6, 1998 (GB) .................................... 9824246

(51) Int. Cl.[7] ............................ F21V 9/00; G06K 9/74; C03C 8/00

(52) U.S. Cl. ........................ 252/582; 252/584; 356/71; 501/14; 501/15; 501/17; 501/18; 501/19; 428/403; 428/406; 428/916; 106/403; 106/419; 106/420; 106/425; 106/432; 106/436; 106/451; 106/452; 106/453; 106/456; 106/461; 106/479; 106/480

(58) Field of Search ................................ 252/582, 584, 252/586; 428/403, 916, 406; 501/14, 15, 501/17–19; 106/403, 419, 420, 425, 432, 106/436, 451–453, 456, 461, 479–480; 356/71

(56) References Cited

U.S. PATENT DOCUMENTS 3,951,672 A * 4/1976 Langley et al. .......... 252/521.3
4,442,170 A * 4/1984 Kaule et al. ................ 428/333
5,372,387 A 12/1994 Wajda .......................... 283/87
6,048,920 A * 4/2000 Ziolo et al. ................. 524/435
6,114,077 A * 9/2000 Voets et al. ................... 430/97

FOREIGN PATENT DOCUMENTS

| | | | |
|---|---|---|---|
| DE | 20 48 853 | 4/1971 | B44F 1/12 |
| DE | 28 45 401 | 2/1980 | B44F 1/12 |
| EP | 0 037 507 | 3/1981 | B44F 1/12 |
| EP | 0 202 902 | 5/1986 | G09F 3/00 |
| EP | 0 202 902 | 11/1986 | G09F 3/00 |
| EP | 0 211 754 | 2/1987 | B44F 1/12 |
| EP | 0 440 554 | 8/1991 | D21H 21/46 |
| EP | 0 849 231 | 6/1998 | C03B 19/14 |
| FR | 2 568 191 | 1/1986 | B44F 1/12 |
| GB | 2 035 208 | 10/1979 | B42D 15/02 |
| WO | WO 81 03509 | 4/1984 | D21H 5/10 |
| WO | WO 94/16902 | 8/1994 | V41M 3/14 |
| WO | WO 98/40224 | 9/1998 | B41M 5/36 |

OTHER PUBLICATIONS

Bank of England Printing Works, Purchase Order, Dated Apr. 21, 1997.*

PCT International Preliminary Examination Report from PCT/GB99/03692, Dated Mar. 15, 2001.

(Continued)

*Primary Examiner*—Philip C. Tucker
(74) *Attorney, Agent, or Firm*—Drinker Biddle & Reath LLP

(57) ABSTRACT

A method of providing covert security features for documents such as vouchers, packaged goods and banknotes in which the document is provided with a dopant. The dopant consisting of a material which can be identified by examination of its response to visible wavelength photon radiation and which can be applied directly on or into the document or can be fused into glass matrices before application.

22 Claims, 11 Drawing Sheets

OTHER PUBLICATIONS

PCT International Search Report from PCT/99/GB99/03692, Dated Feb. 8, 2000.
"Presentation To Task Force A", The SpectraLesen Security System for Bank Notes, Quantum Glass Ltd., Jul. 15, 1997, pp. 1-17.
Purchase Order No. BOE 021759 00, The Bank of England Printing Works, Apr. 21, 1997, 1 page.
Control Development, Inc. letter, Dec. 5, 2001, 1 page.
Letter From Alan Fortune, Director to Bank of England Printing Works, Apr. 3, 1997, 1 page.
"Presentation to SEAGRAM PLC", The SpectraLesen Security System for Commercial Product Authentication, Quantum Glass Ltd, Nov. 3, 1997, pp. 1-9.

* cited by examiner

SECURITY PRINTING

This application is a 371 of PCT/GB99/03692 filed on Nov. 8, 1999.

The invention relates to materials and techniques relating to security printing.

The present invention in its broadest sense is concerned with the provision of security in relation to documents, vouchers, packaged goods and tokens of value. Examples of these are banknotes, cheques and drafts, bond and stock certificates, and credit and bank cards. All of these are referred to hereinafter for simplicity as "documents".

Documents of this nature have the requirement to be as secure as possible against forgery and falsification and for this purpose it is desirable that they exhibit both covert and overt security features. The expression "covert security feature" is used to denote some security feature which is not visually apparent to the normal user, whereas "overt security feature" is used to denote a feature which can be readily seen and recognised by members of the public without the use of specialised equipment or confidential information. Traditional forms of overt security features include water marks, metal security threads, and the use of specialised forms of paper and printing.

Known methods of covert security include NIR and IR absorber inks, magnetic threads, complex optical and electrically conductive indicia, anti-Stokes, visible-wavelength-emitting phosphors etc.

With rapid advances in reprographic technology such as relatively cheap and high quality colour photocopiers and easily available digital image manipulation, the traditional forms of security have become increasingly easy to circumvent. This is because the absorption and emission in the visible, NIR and IR ranges of all the currently used and proposed security dopants are readily available in the public domain since the current materials were developed for the laser and lamp industries. This is particularly true for all the rare earth containing absorbers and emitters, where many thousands of public domain references of absorption and emission spectra are listed from the 1950's onwards. There is accordingly, a requirement for improved forms of both covert and overt security features, preferably ones which can be used with existing printing technology at modest cost.

According to one aspect of the present invention, there is provided a method of providing a document with a covert security feature, in which the document is printing using an ink containing a dopant, the dopant being of a material which can be identified by examination of its response to visible wavelength photo radiation.

This and other aspects and features of the present invention are defined in the appended claims.

The present invention will new be described by way of example with reference to the accompanying drawings of which:

Figure 1:
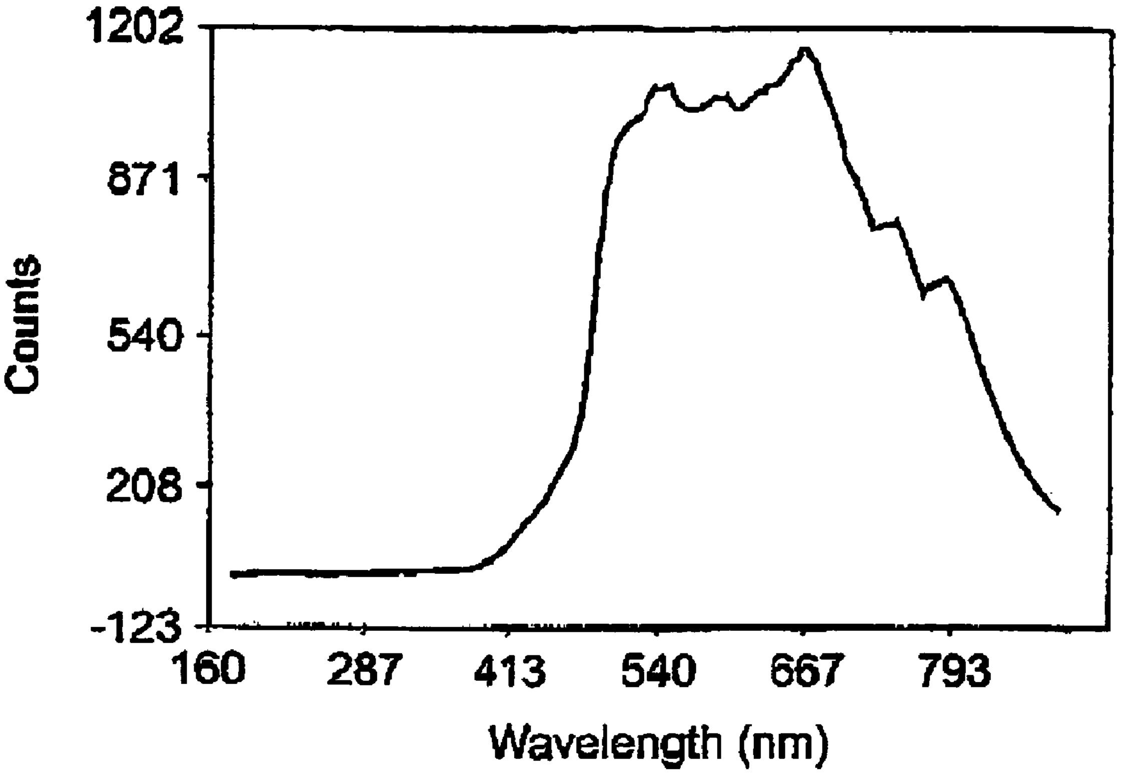
FIG. 1 shows a blue ink reflectance spectrum from a paper print.

The present invention provides a range of inorganic dopants designed with absorption spectra sufficiently different in form and structure from the absorption spectra of printing inks so that the dopants can be easily identified. They thus become very covert because they exhibit no UV, visible or IR stimulated output to be observed by a counterfeiter.

The preferred elements for our dopants can be fused with other elements in order to hide the presence of the dopant element, or to alter its absorption spectrum; or the oxide or salt of preferred element itself can be directly mixed into, for example, a printing ink or a batch composition for plastics production etc. When the dopant is mixed with other elemental compounds and where one of its admixture compounds contains a substantial proportion by weight of a particular range of atomic number (z) elements, varying the proportion of this compound in the final mix can vary the absorption spectrum of the final inorganic mixture, thus essentially creating further dopants.

The present invention depends on the incorporation of a synthesised inorganic dopant into or onto the document at any stage of its manufacture, including the printing stage. These dopands are designed to have very complex visible wavelength absorption spectra, measured in either reflective or transmissive mode. The spectra they exhibit are not found in printing inks or common marbling substrates. This results in high signal-to-noise ratio detection, and hence the ability to identify the dopant in 10 msec or less using low output (c. 4W) bulbs as illuminants.

The dopant incorporation with its unique spectrographic pattern gives independence from document soiling, wear and tear etc, because it allows excellent signal-to-noise ratio. Pattern recognition software to identify, within 1 msec, the complex signature of our synthesised dopants is readily available from suppliers in the public domain, having been used in optical and nuclear spectrometry for 30 years. Dopants in accordance with the present invention can be incorporated singly, mixed, or in separate areas to produce a "bar code", or to simply confuse a forger. The dopants, depending on composition, are either colourless or transparent, or coloured, at the choice of the user. Dopants made in accordance with the present invention provide high optical absorption yet give optical transparency because their absorption features are created at wavelengths to which the human eye is insensitive.

For visible wavelength interpretation the preferred method is to illuminate an area of at least 5 $mm^2$ by a ring of at least 6–8 200 $\mu$ optical fibres in a concentric ring, and channel reflected light through an inner 200 $\mu$ optical fibre to the wavelength detector. It has been found that this number of optical fibres gives sufficient signal for interpretation of the spectra, however the present invention is not limited to this method of detection of the spectrum or the number or arrangement of optical fibres used in this detection method. This eliminates the optical losses due to lenses in much prior art, which in turn leads to the processing speed of our system. CCD based wavelength detectors, followed by A-D conversion for processing are standard technologies in public domain electronics. Our dopants are engineered to give no visible signal, such as fluorescence, upon illumination by UV, visible, or IR radiation and are hence not easily replicated as has happened with fluorescent inks, and other emitting technologies.

Figure 2:
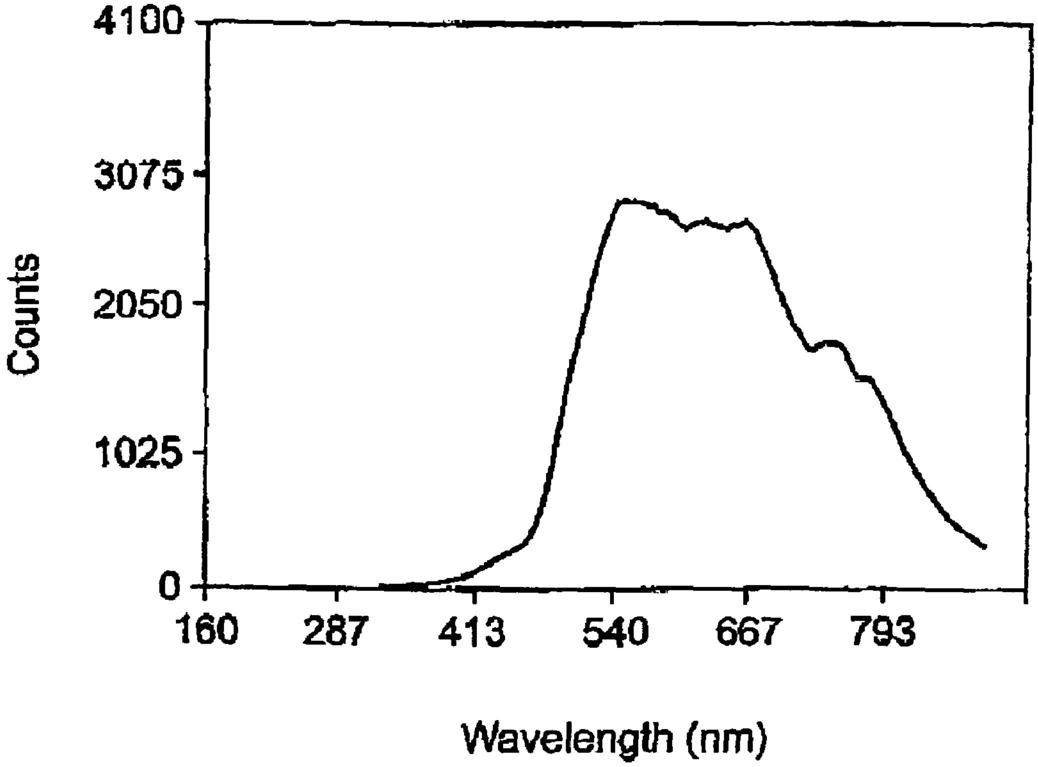
FIG. 2 shows green ink reflectance spectrum from a paper print.
Figure 3:
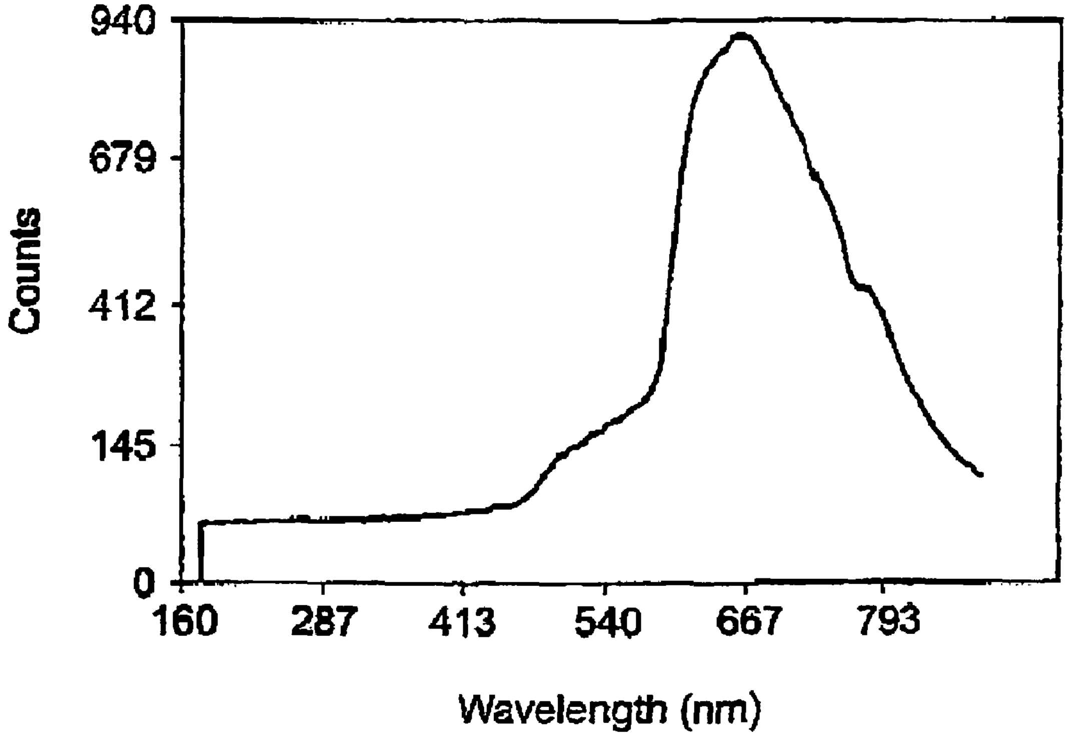
FIG. 3 shows red ink reflectance spectrum from a paper print.

The advantages of the present invention will be readily apparent when the spectra obtained from these dopants is compared with those obtained from standard printing inks, or colourisers in plastics etc. The standard inks and the like give relatively unsophisticated reflectance spectra—see for example FIGS. 1, 2, 3. These show the visible reflectance spectrum of a Pantone standard blue, green and red ink from a paper print. FIGS. 4, 5, 6, 7 show the visible reflectance spectra from the four dopants, Praesodymium Oxide, the Neodymium Oxide, the Holmium Oxide and Thulium Oxide, incorporated in a clear litho varnish and printed on the same paper as that used to obtain the spectra shown in FIGS. 1, 2 and 3.

Figure 4:
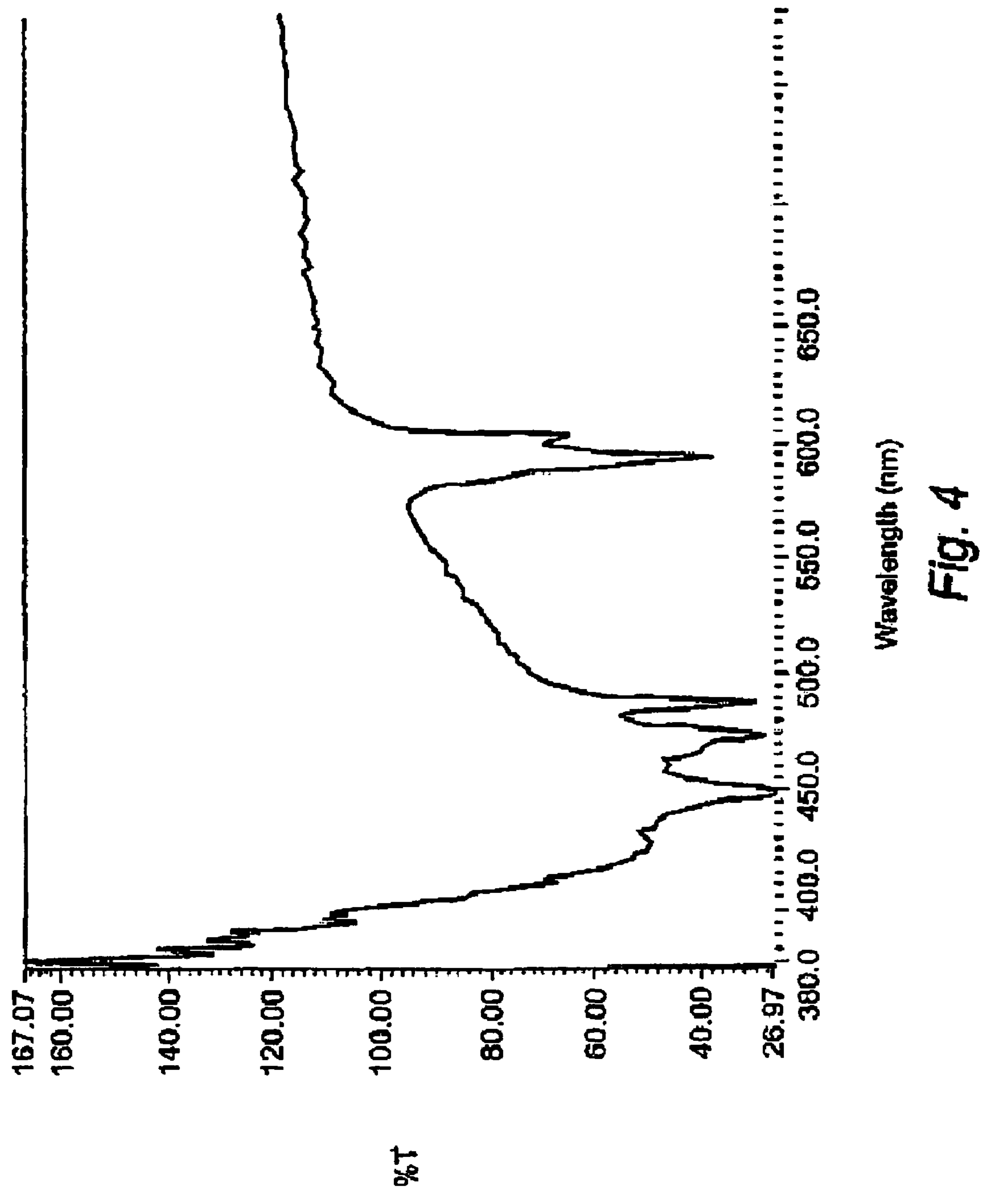
FIG. 4 shows a reflectance spectrum from the Praesodymium Oxide dopant in accordance with the present invention.
Figure 5:
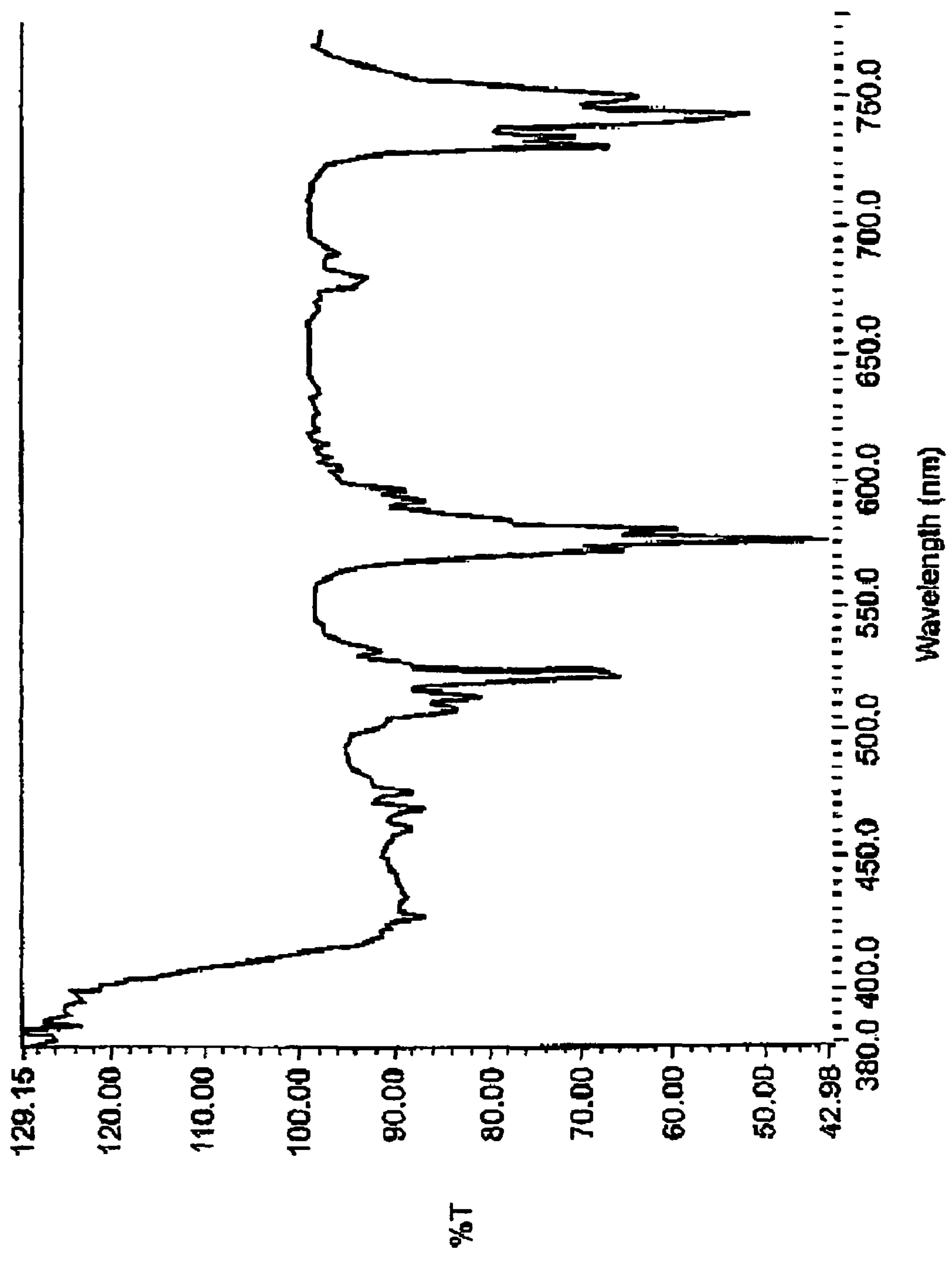
FIG. 5 shows a reflectance spectrum from the Neodymium Oxide dopant in accordance with the present invention.
Figure 6:
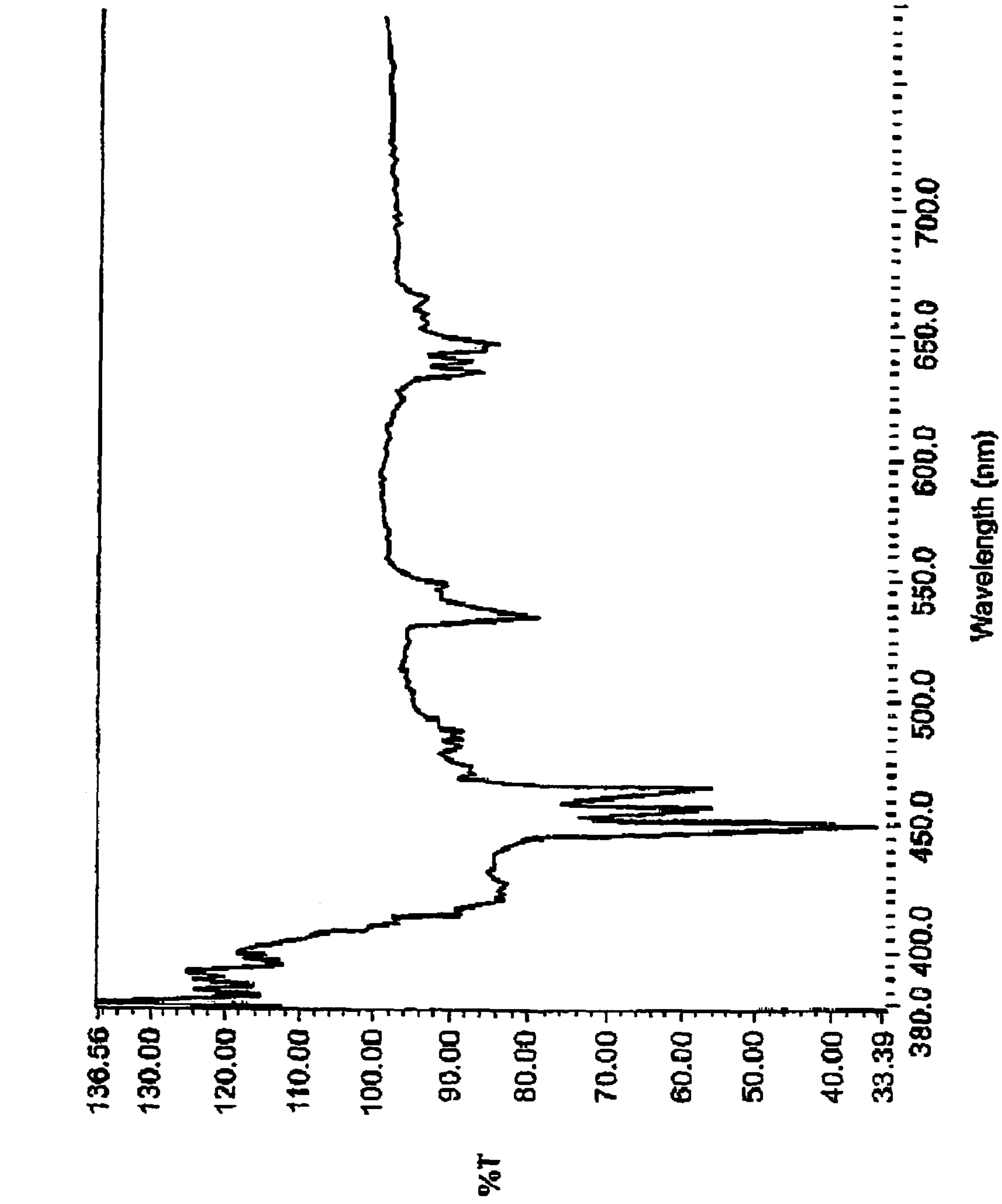
FIG. 6 shows a reflectance spectrum from the Holmium Oxide dopant in accordance with the present invention.
Figure 7:
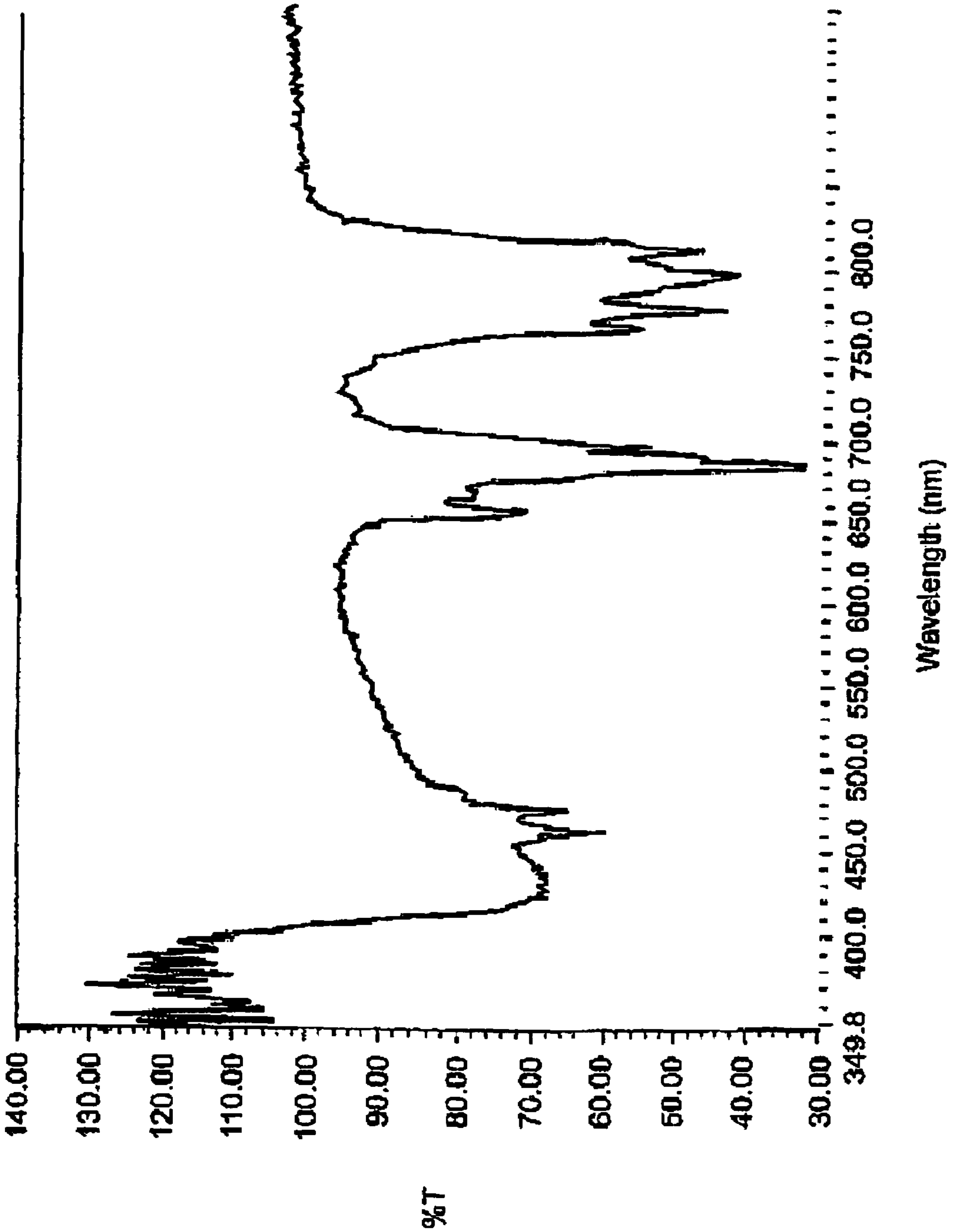
FIG. 7 shows a reflectance spectrum from the Thulium Oxide dopant in accordance with the present invention.

The prints obtained using dopants in accordance with the present invention are completely colourless to the eye. FIG. 4 for example, shows many easily identifiable peaks, troughs and turning points in its spectrum with a shape easily distinguished from any ink or colouring dopants. It is these unique features which give the excellent signal-to-noise ratio, giving the rapid identification ability of our system, with excellent identification rates, and very low false acceptances, together with high rejection for forged copies.

The features, and/or slopes, of the reflectance spectra can be shifted to create other dopants by incorporating the dopants into inorganic compounds of the type described later.

The use of visible wavelength spectrometry, as opposed to IR or NIR wavelengths, makes possible many more commercial applications. This is firstly because of the reduced cost of components for the visible, and secondly because the cheapest excitation source is a common (4W) torch bulb which emits plenty of visible light but very little IR. Hence IR and NIR techniques require more powerful and costly excitation sources. Also by moving to the visible we make it easy to construct simple hand-held portable instrumentation which again increases possible commercial applications.

Visible wavelength spectroscopy as revealed in the prior art with application to security uses lenses or mirrors and lamps to provide the illumination source.

Many suppliers, such as Oriel Corp. USA, now make commercially available reflectance probes which are about 6 mm diameter overall and contain a ring of illuminating fibres (200 $\mu$ diameter 6–8 in number) surrounding a centre core of detecting fibres. Use of these probes gives much improved signal-to-noise ratio at the CCD array, or Si photodiode array, or other detector. Using other off-the-shelf components the output of the array spectrometer can be coupled to D-A converters and operated from a laptop, hand-held palmtop, or desktop PC computers. This can easily be interfaced to standard computer software on production lines for authentication at high speed—10 m/sec.

The dopants we have identified as working well can be added to standard offset litho printing inks in a manner known to those skilled in the art. It is added in quantities up to about 30% by volume without affecting the printing process, providing the dopants have been micronised into fine powders of the order of 1–4 $\mu$m diameter. If this step is omitted poor uniformity printing results. Our dopants need add no colour to the ink, so give a colourless invisible printed strip onto the object to be protected. Alternatively a colouring dopant can be selected to blend in with an existing coloured scheme.

A major advantage of the dopants made in accordance with the present invention is that they are cheap and simple, not requiring the presence of complex expensive chemicals.

The dopants can be applied to artefacts by any standard deposition technique—air spray, lacquering, printing, stamping.

The dopants could also be directly incorporated into paper or plastic (for example) at time of manufacture of said paper or plastic. For our techniques to work it is not necessary that the dopants are added as a superior layer or film, although in many cases this will be the simplest and cheapest method. The fact that our dopant/excitation/detector technology does not require surface deposition can offer more security/covertness to the process. It arises because the excitation methods we are employing have ranges of many tans of microns in common materials such as paper and plastics. Since dopants in accordance with the present invention need not be on the surface of the document the forger is denied the opportunity to scrape off samples from repeated small surface areas and analyse them to look for "surprising" changes in composition from area to area. Such changes give the forger a clue that covert technology is being used in that area.

The multiple peaks, troughs, and turning points resulting give rapid, positive, unambiguous identification of dopant presence (and hence object authenticity) and allow multiple dopants to be used as a further method of disguise, if required.

The preparation of the inorganic powders for doping to permit identification by visible light is not limited to the use of chemical compounds which could be formed by precipitation from a solution because such compounds are limited in numbers. It has been found that the most useful compounds (those with the most distinctive absorption spectra in the visible) could be formed by fusion melting. Silicates, phosphates, borates have been found to be the most useful starting points for fusion, because they give transparent glass matrices.

In forming the required solids for powdering, the chemical batch composition is not, for example, limited to that required to produce, say, a glass. This is because long range atomic order to is not required in the solid, since homogeneity is assured by micronising the composition. Indeed in general terms we have found that the best compositions are obtained where phase separation of the melt temperature is imminent. This point is determined experimentally for each composition. Nor need the chemistry be limited to stoichometric ratios such as to arrive at crystalline compounds, e.g. as used to produce the commonplace inorganic fluorescence powders added to printing inks.

In many compositions, the structure and magnitude of the absorption peaks can be controlled over a wide range by control of the gas atmosphere during the melt phase. This is established by trial and error for each composition by test melting each composition in air, in a reducing atmosphere, and in an oxidising atmosphere to determine the optimum methodology and conditions for the absorption profile required.

In many compositions, the structure and magnitude of absorption peaks can be controlled by including a substantial quantity (>20% by weight) of a high atomic number Z element in the batch composition (lanthanum, bismuth, and strontium work well, as examples). Then varying the content of this high Z element only gives changes in position and magnitude of the absorption peaks, from composition to composition. Different absorption peak wavelengths and magnitudes from that exhibited by the raw dopant before being incorporated in a glass.

The effect of incorporating the dopant in a glass on its spectrum can be seen in FIGS. 8, 9, 10 and 11.

Figure 8:
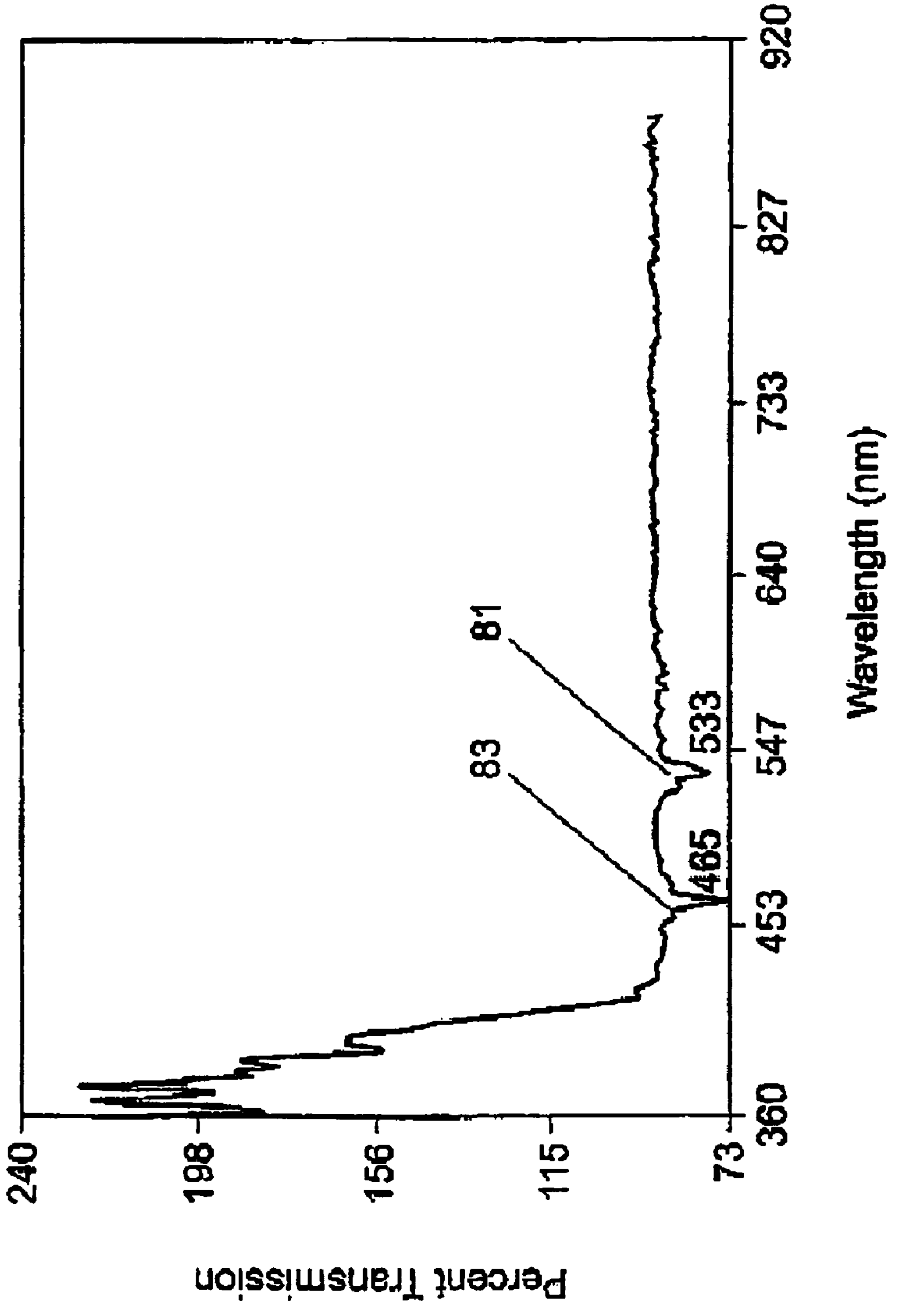
FIG. 8 shows a reflectance spectrum of raw Europium Oxide powder as used in the present invention.
Figure 9:
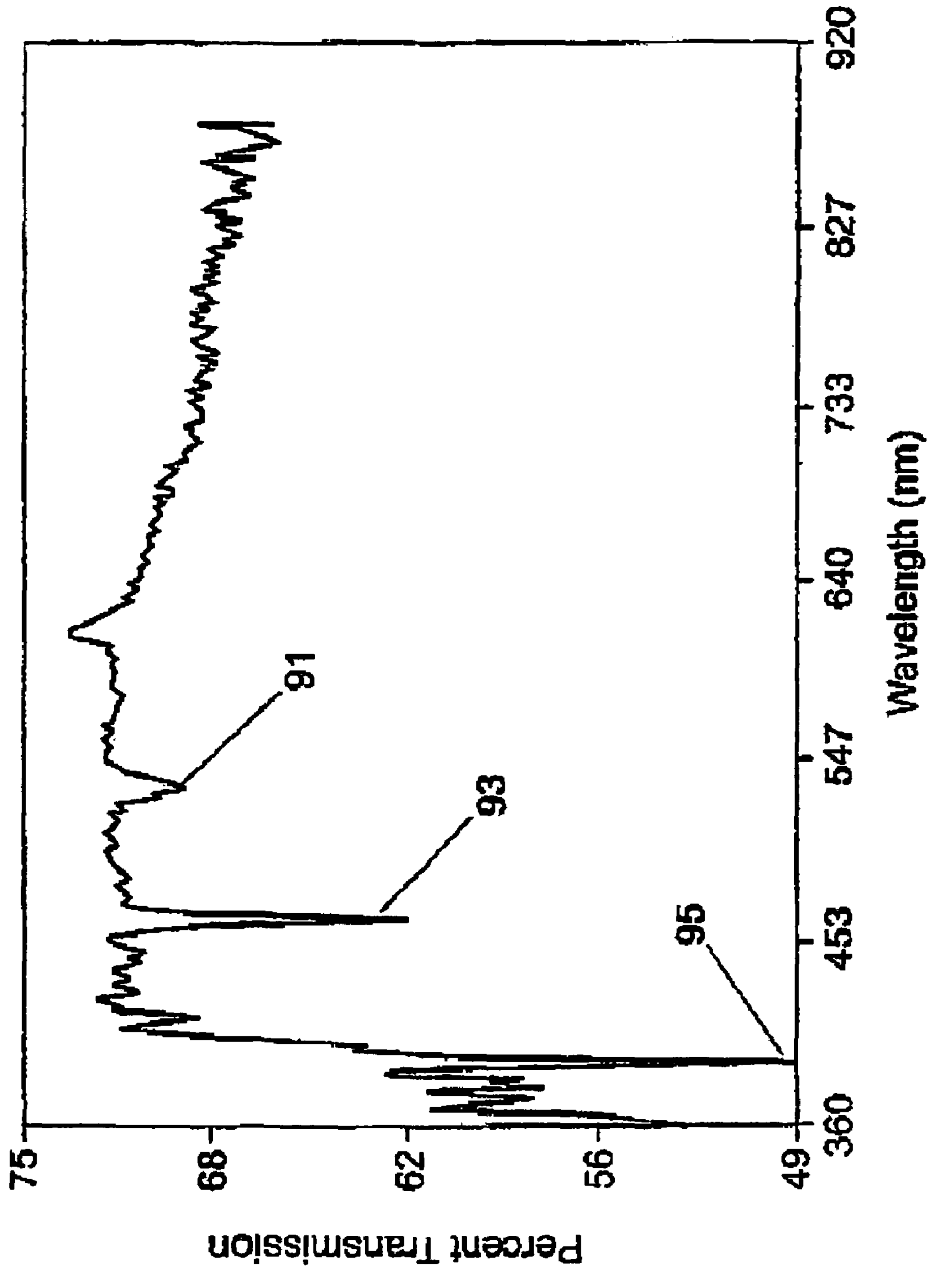
FIG. 9 shows a reflectance spectrum of the same European Oxide contained in glass.

FIG. 8 shows a plot of the percent transmission against wavelength (nm) for a raw Europium Oxide dopant powder. FIG. 9 shows a plot of the percent transmission against wavelength (nm) for a Europium Oxide dopant powder incorporated in a glass and ground into a fine powder. The substances contained in the glass are as given in Table 1 below and the glass plus dopant is made in accordance with the method given below Table 1 on page 14.

Simply from visual inspection it can be seen that the two spectra are very different.

The feature of the spectrum of Europium Oxide shown at reference numeral 81 for the raw oxide powder that occurs at a wavelength of 533 nm has been shifted to 531 nm. A similar shift can be seen for the lower wavelength peaks 83 and 93. In both cases, the shift in wavelength was 2 nm. The most significant difference between the spectra of FIG. 8 and FIG. 9 is the presence of the line in the spectrum of the Europium Oxide contained in glass at 393 nm. There is no similar line in the raw powder spectrum.

Figure 10:
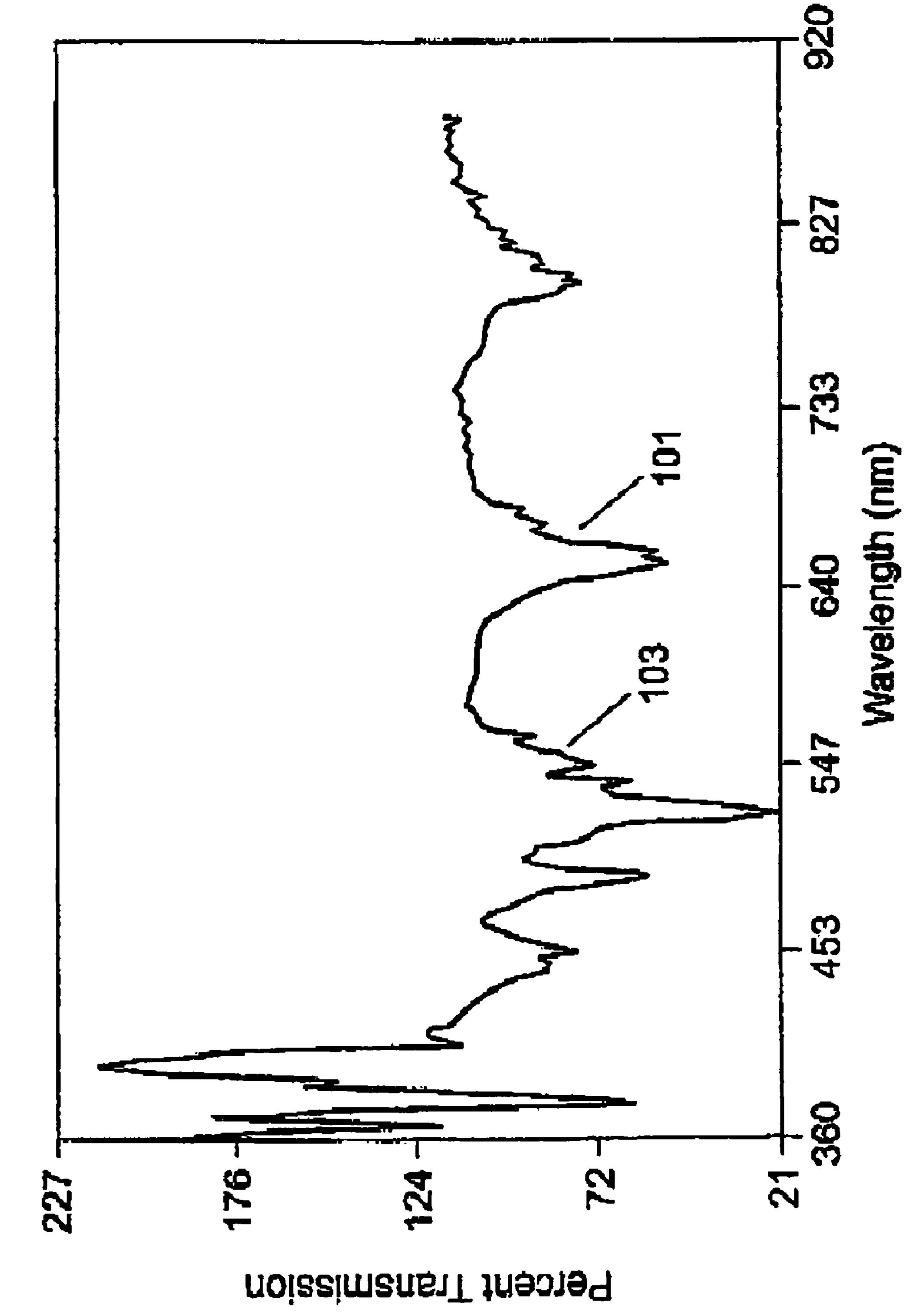
FIG. 10 shows a reflectance spectrum of raw Erbium Oxide powder as used in the present invention.
Figure 11:
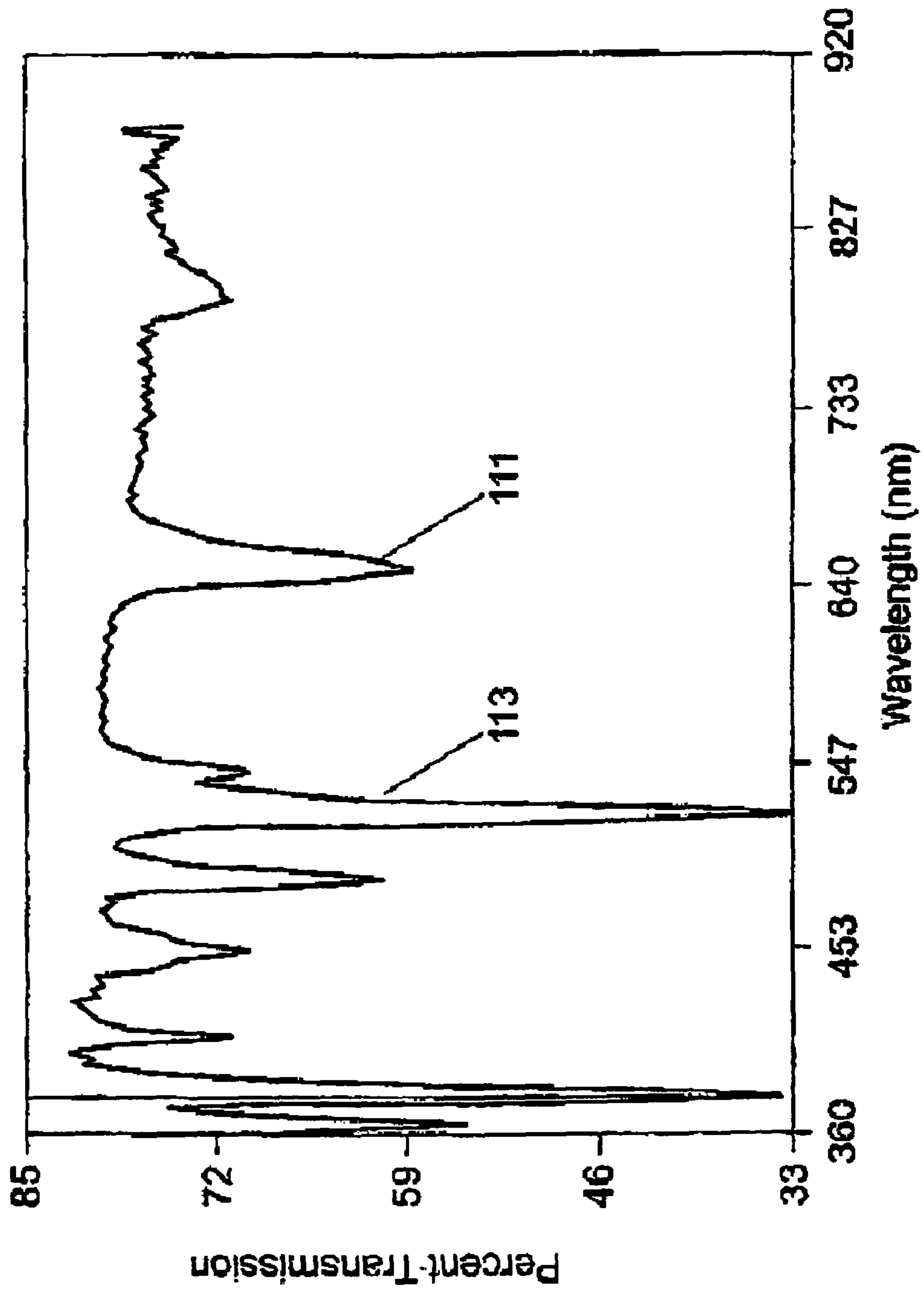
FIG. 11 shows a reflectance spectrum of the same Erbium Oxide contained in glass.

FIG. 10 shows a plot of the present transmission against wavelength (nm) for a raw Erbium Oxide dopant powder. FIG. 11 shows a plot of the percent transmission against wavelength (nm) for an Erbium Oxide dopant powder incorporated in a ground fine powder glass. As with the sample used to obtain the spectrum if FIG. 9, the substances contained in the glass are as given in Table 1 below and the glass plus dopant is made in accordance with the method given below Table 1 on page 14.

FIG. 10 shows, at reference numeral 101, the existence of multiple peak structure occurring from a minimum point at 654 nm to approximately 700 nm. It can be seen that these features are absent from the spectrum of FIG. 11 as indicated at reference numeral 111.

FIG. 10 also has multiple peak structure occurring from a minimum value at 521 nm up to approximately 600 nm. These features are absent from the spectrum of FIG. 11 as can be seen at reference numeral 113.

We have shown our dopant technology to work in a wide variety of compounds, including, but not limited to, silicates, borosilicates, borates and germanates.

The following are a number of examples of the composition and method of manufacture of a doped glass in accordance with the present invention.

EXAMPLE 1

A glass batch of a typical suitable composition is as follows.

TABLE 1

| Compound | Wt % |
|---|---|
| $SiO_2$ | 35% |
| $B_2O_3$ | 40.0 |
| $Na_2O$ | 8.5 |
| $K_2O$ | 8.5 |
| $Al_2O_3$ | 1.0 |
| MgO | 4.0 |

To this batch was added 0.1 to 25 wt % of $Eu_2O_3$. All powder sizes can be used but approximately 250 mesh is preferable. A wide range of crucibles can be used, a Platinum crucible was used in this case. The final batch is mixed and homogenised that it is added to the crucible heated to 845° C. The temperature is then increased at a rate of approximately 5° C./min to 1200° C. the final melt temperature. It has been found that good quality melts are produced by holding the melt at the final temperature for between 2 and 2.5 hours before powdering the glass. For absorber products not visible to the naked eye, the natural emissions of $Eu_2O_3$ may be quenched by the use of high concentrations of $Eu_2O_3$ or by the inclusion of small <1% quantities of nickel oxide, silver oxide or lead oxide as luminescence quenchers.

The following compositions may also be used

TABLE 2

| Compound | Wt (g) | Compound | Wt (g) | Compound | Wt (g) |
|---|---|---|---|---|---|
| $SiO_2$ | 55 | $SiO_2$ | 70 | $SiO_2$ | 50 |
| $B_2O_3$ | 65 | $B_2O_3$ | 80 | $Be_2CO_3$ | 20 |
| $Na_2CO_3$ | 29 | $Na_2CO_3$ | 29 | $Sr_2CO_3$ | 20 |
| $K_2CO_3$ | 20 | $K_2CO_3$ | 20 | $Na_2CO_3$ | 10 |
| $Li_2CO_3$ | 5 | $Li_2CO_3$ | 5 | $K_2CO_3$ | 10 |
| $Al_2O_3$ | 2 | $Al_2O_3$ | 2 | $Li_2CO_3$ | 5 |
| MgO | 8 | MgO | 5 | $Al_2O_3$ | 2 |
| | | | | MgO | 5 |

TABLE 3

| Compound | Wt (g) | Compound | Wt (g) |
|---|---|---|---|
| $SiO_2$ | 35 | $SiO_2$ | 55 |
| $B_2O_3$ | 80 | $B_2O_3$ | 65 |
| $Be_2CO_3$ | 40 | $Na_2CO_3$ | 29 |
| $Na_2CO_3$ | 29 | $K_2CO_3$ | 20 |
| $K_2CO_3$ | 20 | $Li_2CO_3$ | 5 |
| $Li_2CO_3$ | 5 | $Al_2O_3$ | 2 |
| $Al_2O_3$ | 2 | MgO | 8 |
| MgO | 8 | | |

Another suitable composition is of the type

TABLE 4

| Compound | Wt % |
|---|---|
| $SiO_2$ | 51 |
| $B_2O_3$ | 13 |
| $Al_2O_3$ | 8 |
| MgO | 6 |
| CaO | 10 |
| SrO | 4 |
| ZnO | 4 |

This is particularly suitable as a base for incorporating dopants for visible wavelength absorption detection because all the base elements have largely unfeatured absorption spectra.

Dopants have also been successfully incorporated into glass matrices with the following ranges of chemical composition.

$30–56$ wt % $SiO_2$,
$5–35$ wt %, $La_2O_3/Bi_2O_3/Sr_2O_3$,
$2–33$ wt % $Li_2O/K_2O/Na_2O$,
$0–6\%$ $Al_2O_3$ wherein the La, Bi, Sr are examples of a suitable high Atomic number component.

Incorporation of all three alkaline earth compounds, plus BaO, gives much reduced melting temperatures.

Preferred elements for dopant fabrication for visible wavelength absorption system

TABLE 5

| | |
|---|---|
| Barium | Zinc |
| Lanthanum | Samarium |
| Lead | Praesodymium |
| Magnesium | Europium |
| Strontium | Boron-10 |
| Titanium | Neodymium |
| Chromium | Holmium |
| Iron | Thulium |
| Caesium | Cadmium |
| Molybdemum | Antimony |
| Nickel | Erbium |
| Tungsten | Lutecium |
| Cobalt | Tin |
| Sodium | |
| Potassium | |
| Terbium | |

Improvements and modifications may be incorporated without deviating from the scope of the invention.

What is claimed is:

1. A method of providing a document with a covert security feature in which the document is provided with at least one inorganic dopant, the dopant being of a material which can be identified by examination of its visible wavelength absorption spectrum, measured in either reflective or transmissive mode, in response to broadband visible wavelength photon radiation, in which the dopant is fused with other elements and micronised into a fine powder before being applied to or otherwise incorporated into the document, thereby altering said visible wavelength absorption spectrum of the dopant, and in which the dopant exhibits no UV, visible or IR stimulated output, and in which the dopant is fused into a glass.

2. A method of providing a document with a covert security feature in which the document is provided with at least one inorganic dopant, the dopant being of a material which can be identified by examination of its visible wavelength absorption spectrum, measured in either reflective or transmissive mode, in response to broad-band visible wavelength photon radiation, in which the dopant is fused with other elements and micronised into a fine powder before being applied to or otherwise incorporated into the document, thereby altering said visible wavelength absorption spectrum of the dopant, and in which the dopant exhibits no UV, visible or IR stimulated output, and in which the dopant is such that, when the document is illuminated with broadband visible light the absorption features of said visible wavelength absorption spectrum are created at wavelengths to which the human eye is insensitive.

3. A method of providing a document with a covert security feature in which the document is provided with at least one inorganic dopant, the dopant being of material which can be identified by examination of its visible wavelength absorption spectrum, measured in ether reflective or transmissive mode, in response to broad-band visible wavelength photon radiation, in which the dopant is fused with other elements and micronised into a fine powder before being applied to or otherwise incorporated into the document, thereby altering said visible wavelength absorption spectrum of the dopant, and in which the dopant exhibits no UV, visible or IR stimulated output; and in which the dopant is mixed with a quantity of an element with an atomic number greater than 36, or its salt or its oxide.

4. A method of providing a document with a covert security feature in which the document is provided with at least one inorganic dopant, the dopant being of a material having a complex visible wavelength absorption spectrum including multiple identifiable absorption features and which can be identified by examination of said visible wavelength absorption spectrum, measured in either reflective or transmissive mode, in response to broad-band visible wavelength photon radiation, in which the dopant is fused with other elements and micronised into a fine powder before being applied to or otherwise incorporated into the document, thereby altering said visible wavelength absorption spectrum of the dopant, and in which the dopant exhibits no UV, visible or IR stimulated output; and in which the dopant is fused in a glass.

5. A method of making a dopant for use in providing a document with a covert security feature, said dopant having a complex visible wavelength absorption spectrum including multiple identifiable absorption features and which can be identified by examination of said visible wavelength absorption spectrum, measured in either reflective or transmissive mode, in response to broadband visible wavelength photon radiation, comprising fusing one or a combination of the element Barium, Zinc, Lanthanum, Samarium, Lead, Praseodymium, Magnesium, Europium, Strontium, Boron-10, Titanium, Neodymium, Chromium, Holmium, Iron, Thulium, Caesium, Cadmium, Molybdenum, Antimony, Nickel, Erbium, Tungsten, Lutetium, Cobalt, Tin, Sodium, Potassium, Terbium, in elemental form or as an oxide or salt, in a glass and subsequently micronising said glass into a fine powder, thereby altering said visible wavelength absorption spectrum of the dopant, said dopant exhibiting no UV, visible or IR stimulated output.

6. A method of providing a document with a covert security feature as claimed in claim 4, in which the dopant comprises one of, or a combination of the elements Barium, Zinc, Lanthanum, Samarium, Lead, Praseodymium, Magnesium, Europium, Strontium, Boron-10, Titanium, Neodymium, Chromium, Holmium, Iron, Thulium, Caesium, Cadmium, Molybdenum, Antimony, Nickel, Erbium, Tungsten, Lutetium, Cobalt, Tin, Sodium, Potassium, Terbium, in elemental form or as an oxide or salt.

7. A method of providing a document with a covert security feature as claimed in claim 3 in which the element or its salt or its oxide is Strontium, Lanthanum or Bismuth.

8. A method of providing a document with a covert security feature as claimed in claim 3, in which the dopant is mixed with ink and the resulting mixture is applied to the document.

9. A method of providing a document with a covert security feature as claimed in claim 4 in which the glass is made of silicates and/or phosphates and/or borates.

10. A method of providing a document with a covert security feature as claimed in claim 3, in which each particle of the micronised fine powder has a diameter of 1–4 $\mu$m.

11. A method of providing a document with a covert security feature as claimed in claim 3, in which the dopant is such that, when the document is illuminated with broadband visible light to produce a reflectance spectrum with frequency components generated by the dopant and by other reflecting substances contained in the document, said spectrum, contains minimal frequency overlap between the components of the spectrum generated by the dopant and that part of the spectrum generated by other substances contained in the document.

12. A method of providing a document with a covert security feature as claimed in claim 3, in which the dopant is such that, when the document is illuminated with broadband visible light the absorption features of said visible wavelength absorption spectrum are created as wavelengths to which the human eye is insensitive.

13. A method of providing a document with a covert security feature as claimed in claim 3, in which said visible wavelength absorption spectrum of the dopant can be shifted to a higher or lower wavelength.

14. A method of providing a document with a covert security feature as claimed in claim 3, in which said visible wavelength absorption spectrum of the dopant can be shifted to a higher or lower wavelength by alteration of the composition of the glass in which it is fused.

15. A method of providing a document with a covert security feature as claimed in claim 3, in which said visible wavelength absorption spectrum of the dopant is alterable by alteration of the reaction temperature and/or pressure at which the glass is made.

16. A document provided with a covert security feature by the method of claim 3.

17. A method of providing a document with a covert security feature as claimed in claim 4, in which the dopant is mixed with ink and the resulting mixture is applied to the document.

18. A method of providing a document with a covert security feature as claimed in claim 4, in which each particle of the micronised fine powder has a diameter of 1–4 $\mu$m.

19. A method of providing a document with a covert security feature as claimed in claim 4, in which the dopant is such that, when the document is illuminated with broadband visible light to produce a reflectance spectrum with frequency components generated by the dopant and by other reflecting substances contained in the document, said spectrum contains minimal frequency overlap between the components of the spectrum generated by the dopant and that part of the spectrum generated by other substances contained in the document.

20. A method of providing a document with a covert security feature as claimed in claim 4, in which the dopant is such that, when the document is illuminated with broadband visible light the absorption features of said visible wavelength absorption spectrum are created at wavelengths to which the human eye is insensitive.

21. A method of providing a document with a covert security feature as claimed in claim 4, in which said visible wavelength absorption spectrum of the dopant can be shifted to a higher or lower wavelength.

22. A document provided with a covert security feature by the method of claim 1.

* * * * *